United States Patent
Heuclin et al.

(10) Patent No.: US 10,081,162 B2
(45) Date of Patent: Sep. 25, 2018

(54) ADHESIVE BONDING PROCESS

(71) Applicant: SAINT-GOBAIN PERFORMANCE PLASTICS FRANCE, Charny Orée de Puisaye (FR)

(72) Inventors: Hadrien Heuclin, Paris (FR); Alban Letailleur, Paris (FR)

(73) Assignee: SAINT-GOBAIN PERFORMANCE PLASTICS FRANCE, Charny Orée de Puisaye (FR)

( * ) Notice: Subject to any disclaimer, the term of this patent is extended or adjusted under 35 U.S.C. 154(b) by 0 days.

(21) Appl. No.: 15/348,585

(22) Filed: Nov. 10, 2016

(65) Prior Publication Data

US 2017/0129209 A1  May 11, 2017

(30) Foreign Application Priority Data

Nov. 10, 2015 (FR) .................... 15 60729

(51) Int. Cl.
| | | |
|---|---|---|
| B32B 7/12 | (2006.01) | |
| B32B 5/18 | (2006.01) | |
| B32B 27/06 | (2006.01) | |
| B32B 37/12 | (2006.01) | |
| C09J 5/02 | (2006.01) | |
| C09J 5/04 | (2006.01) | |

(52) U.S. Cl.
CPC ............ *B32B 7/12* (2013.01); *B32B 5/18* (2013.01); *B32B 27/06* (2013.01); *B32B 37/12* (2013.01); *C09J 5/02* (2013.01); *C09J 5/04* (2013.01); *B32B 2305/72* (2013.01); *B32B 2405/00* (2013.01); *C09J 2433/00* (2013.01); *C09J 2463/00* (2013.01); *C09J 2475/00* (2013.01)

(58) Field of Classification Search
CPC .. C09J 2483/00; C09J 7/0207; C09J 2433/00; B32B 33/00
See application file for complete search history.

(56) References Cited

U.S. PATENT DOCUMENTS

| 4,351,686 A * | 9/1982 | Clark ................. B32B 25/04 |
| | | 156/315 |
| 5,714,254 A * | 2/1998 | Jacob ................. 428/355 BL |
| 6,233,872 B1 | 5/2001 | Glagow et al. |
| 6,485,030 B1 | 11/2002 | Hahn et al. |
| 7,422,788 B2 | 9/2008 | Hahn et al. |
| 7,569,278 B2 | 8/2009 | Utesch et al. |
| 2004/0007827 A1 | 1/2004 | Hahn |
| 2004/0191510 A1* | 9/2004 | Kiuchi ............ H01L 21/6835 |
| | | 428/355 RA |
| 2006/0078702 A1 | 4/2006 | Velard |

FOREIGN PATENT DOCUMENTS

| EP | 0357973 B1 | 9/1992 |
| EP | 1095808 A2 | 5/2001 |
| EP | 0981458 B1 | 10/2001 |
| EP | 1375225 B1 | 3/2006 |
| EP | 1343651 B1 | 3/2010 |
| FR | 2875233 A1 | 3/2006 |
| WO | 2017081216 A1 | 5/2017 |

OTHER PUBLICATIONS

International Search Report and Written Opinion for PCT Application No. PCT/EP2016/077369, dated Dec. 8, 2016, 10 pages.

* cited by examiner

*Primary Examiner* — Alexandre F Ferre
(74) *Attorney, Agent, or Firm* — Abel Law Group, LLP; Chi Suk Kim

(57) ABSTRACT

An assemblage including a silicone part; and a double-sided adhesive tape including a support tape, a first layer of a pressure-sensitive adhesive (PSA) on a first face of the support tape, a second layer of a PSA on a second face of the support tape, and where the silicone part and the double-sided adhesive tape are adhesively bonded to one another using a non-silicone-based structural adhesive.

20 Claims, No Drawings

ADHESIVE BONDING PROCESS

CROSS-REFERENCE TO RELATED APPLICATION(S)

This application claims priority under 35 U.S.C. § 119(b) to French Patent Application No. 1560729 entitled "PROCEDE DE COLLAGE," by Hadrien Heuclin and Alban Letailleur, filed Nov. 10, 2015.

FIELD OF THE DISCLOSURE

The present disclosure relates to a novel process for fixing an adhesive tape to a silicone part, in particular to a silicone profiled element, and also to the assemblage obtained by this process.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Group numbers corresponding to columns within the Periodic Table of Elements based on the IUPAC Periodic Table of Elements, version dated Jan. 21, 2011.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the adhesive and assemblage arts.

The fixing of silicone seals to the bodywork of aircraft, trains or motor vehicles can be carried out by means of an RTV (Room Temperature Vulcanizable) silicone adhesive. However, the curing of the two-component mixture is fairly long, of the order of several hours to several tens of hours, and the maintenance in position of the seals for such a long period of time can be complicated to carry out. This way of adhesively bonding the seals directly to the support by means of a silicone-based structural adhesive requires a large storage space and reduces the overall productivity of the process.

The idea of creating, on the silicone seal, an adhesive surface capable of instantaneously bonding to another material, for example by attaching, to the seal, an adhesive tape carrying a pressure-sensitive adhesive (PSA), generally comes up against the difficulty of creating an adhesive bond of sufficient strength between such an adhesive tape and the surface of the silicone.

The hydrophobic surface of the silicone can be subjected to oxidizing surface treatments (plasma, corona, UV-ozone) in order to increase, at least temporarily, the surface energy thereof and to create —SiOH groups capable of reacting with an adhesive. This increase in the surface energy may not stable over time and the material may gradually become hydrophobic again.

Applicant has carried out a number of trials targeted at obtaining a strong adhesive bond between a PSA adhesive tape and a silicone surface activated (rendered more hydrophilic) beforehand by a surface treatment. It has tested embodiments including silicone-based and non-silicone-based structural adhesives, and also various pressure-sensitive adhesives (PSAs) making possible instantaneous adhesion between the two surfaces.

These trials have shown that, surprisingly, in certain embodiments higher adhesion (peel strength) values can be obtained by combining a structural adhesive with an adhesive of PSA type. In other words, Applicant has found that, in certain embodiments, the presence of an adhesive of PSA type on the face of the adhesive tape intended to be brought into contact with the silicone profiled element can increase the peel strength of an adhesive connection produced using a structural adhesive.

In an embodiment, the PSA adhesive, present in the form of a thin layer at the surface of the support tape, does not weaken the adhesive bond, as might have been feared, but spectacularly reinforces it, the peel strength being, in certain embodiments, approximately from two to ten times higher than in the absence of PSA.

The present disclosure is thus based on the discovery that PSAs, normally intended to directly bond adhesively, by virtue of their high tack, to the substrate to be adhesively bonded, can operate as a kind of tie layer, or primer layer, for a structural adhesive.

An embodiment of the present disclosure can include an adhesive bonding process including:
  treating at least one region of the surface of a silicone part so as to increase the surface energy of the region treated to a value greater than 30 $mJ/m^2$, preferably greater than 35 $mJ/m^2$,
  providing a double-sided adhesive tape including:
    a support tape, preferably made of organic polymer,
    a first layer of a PSA on a first face of the support tape, intended to be brought into contact with the silicone part,
    a second layer of a PSA on the second face of the support tape,
  applying a non-silicone-based structural adhesive to the treated region of the surface of the silicone part and/or to the first PSA layer, contacting the treated region of the surface of the silicone part with the first PSA layer, at least one of these two surfaces carrying the structural adhesive, and curing the non-silicone-based structural adhesive.

An embodiment of the present disclosure can include an assemblage obtainable by such a process, the assemblage including:
  a silicone part and
  a double-sided adhesive tape including:
    a support tape, preferably made of organic polymer,
    a first layer of a PSA on a first face of the support tape,
    a second layer of a PSA on the second face of the support tape,
  the silicone part and the double-sided adhesive tape can be irreversibly adhesively bonded to one another using a non-silicone-based structural adhesive.

A structural adhesive is an adhesive that can be used to irreversibly adhesively bond two materials together. In an embodiment, a structural adhesive may cure by evaporation of a solvent, par cooling (hot melt adhesives) or by chemical reaction and formation of a three-dimensional polymeric network (crosslinking). In a particular embodiment, a structural adhesive used in the present disclosure can be selected from those that cure by chemical reaction. The glass transition temperature (Tg) of a structural adhesive is generally but not necessarily significantly greater than the operating temperature envisaged. In an embodiment, the structural adhesive can be in the glassy and rigid material state. In another embodiment, a structural adhesive, in particular polyurethanes, intended for use at a temperature greater than their Tg, can be used but can be less powerful than those having a high Tg. In an embodiment, whether it is greater than or lower than the operating temperature envisaged, it is generally advisable to choose the structural adhesives with a Tg which is a fairly long way from this operating temperature, if their adhesion performance is not to be seen to vary strongly in the event of thermal variations.

In an embodiment, the main chemical categories of structural adhesives can include epoxy, acrylic, cyanoacrylic and phenolic adhesives, and also polyurethanes and silicones. As used herein, the term "structural adhesive" does not encompass silicone-based adhesives. The structural adhesives used in the present disclosure can be non-silicone-based adhesives, that is to say they can include less than 30% by weight, less than 10% by weight, less than 5% by weight and ideally less than 1% by weight of polyorganosiloxanes.

As used herein, the term "structural adhesive" encompasses both one-component and two-component adhesive compositions.

In an embodiment, the structural adhesive includes chemical functional groups capable of reacting with groups having labile hydrogen, in particular hydroxyl groups, such as isocyanate functional groups (present in polyurethanes) and epoxide functional groups (present in epoxy adhesives). The presence of such functional groups can provide good adhesion of the structural adhesive at the surface of the silicone part carrying, after surface treatment, a multitude of SiOH functional groups.

For the reasons set out above, a structural adhesive chosen from epoxy adhesives and polyurethanes can be used.

The polyurethane structural adhesive compositions of type can include prepolymers having isocyanate functional groups and a curing agent, generally a polyol or another compound comprising at least two functional groups having labile hydrogen. The curing agent can also be atmospheric moisture. Structural adhesives of polyurethane type are described, inter alia, in the following patents: U.S. Pat. Nos. 4,511,626, 4,515,933, 4,551,517, 5,290,853, 5,719,252, 5,723,534, 5,852,103, 5,900,809 and 6,130,268, each of which is incorporated herein by reference in its entirety.

They are, for example, adhesives of the 3M™ SCOTCH-WELD™ Urethane Adhesive range or BOSTIK™ PU construction mastics.

Epoxy structural adhesives generally comprise monomers or prepolymers having glycidyl functional groups and an amine curing agent. Epoxy structural adhesives are described, for example, in the following patent applications: U.S. Pat. Nos. 7,157,143, 8,618,204, US 2004/0072927, and US 2008/0045670, each of which is incorporated herein by reference in its entirety. Epoxy structural adhesives can be provided in the form of one-component compositions or of two-component kits comprising two reactive compositions which are mixed immediately before use.

Pressure sensitive adhesives (PSAs) can be present in the form of a thin layer carried by a support. They can adhesively bond virtually immediately, by simple contact and application of a pressure, to the material to be adhesively bonded. Although there exist some PSAs having a very high adhesiveness, other PSAs are regarded as non-structural or semistructural adhesives, that is to say the adhesive bonding is reversible. The glass transition temperature of PSAs is generally lower than the operating temperature envisaged. At ambient temperature, the polymer network forming the adhesive layer can be a viscoelastic fluid, the high mobility of the polymer chains can assist in the formation of a multitude of weak bonds (van der Waals and hydrogen bonds) between the adhesive and the surface to be adhesively bonded.

The PSAs can be characterized by their tack, their peel strength and their shear strength.

Typically, three main chemical categories of pressure-sensitive adhesives are distinguished:
  elastomer-based PSAs,
  acrylic PSAs and
  silicone-based PSAs.

In an embodiment, the PSAs do not include silicone-based PSAs. Those used on the first face of the double-sided adhesive tape can be acrylic PSAs. The PSA applied to the second face of the tape can be freely chosen according to the material to which it has to adhere.

Double-sided adhesive tapes comprising at least one layer of acrylic PSA are known and are described in numerous patent applications, of which mention may be made, by way of examples, of the following: US2011/0244230, US2011/012966, US2013/0078463, U.S. Pat. No. 8,828,539, US2001/0033988, EP 0 587 752, EP 2 385 090, EP 2 499 194, EP 2 551 320 and US 2011/0043737.

Such double-sided adhesive tapes comprising at least one acrylic PSA layer are commercially available and are sold, for example, by Saint-Gobain Performance Plastics under the name NORMOUNT® A6100 to A6300 or by SCAPA under the names AS1270, AS1160, AS197K and C705.

The first PSA layer, intended to be adhesively bonded by means of a structural adhesive to the surface of the silicone part, exhibits a weight per unit area of between 10 and 50 $g/m^2$, preferably between 15 and 40 $g/m^2$.

The support tape can be made of any material appropriate for the use envisaged. It can be a tape based on cellulose fibres, such as paper, or on polymer fibres assembled in the form of nonwovens. In a preferred embodiment, the support tape can be a film based on thermoplastic organic polymer. It can be an expanded film, that is to say a foam.

The polymer forming the support tape of the double-sided adhesive tape of the present disclosure can be selected from the group consisting of polyesters, poly(vinyl chloride), fluoropolymers, polyimides, EPDM (terpolymer of ethylene, propylene, and diene), polyurethanes, acrylates and polyolefins, such as polyethylene. Patents describing procedures for the preparation of EPDM elastomers from monomeric mixtures of alphaolefins and polyenes include U.S. Pat. Nos. 2,933,480; 3,093,620; 3,093,621; and 3,211,709, each of which is incorporated herein by reference.

In a specific embodiment, the double-sided adhesive tape can be composed of a homogeneous mass of acrylic foam adhesive. In such an adhesive tape, the three layers described above (first PSA layer, support tape and second PSA layer) cannot be distinguished from one another as they are formed of one and the same material, namely a viscoelastic acrylic material exhibiting, at the surface, the properties of a PSA. Such tapes are sold by 3M under the VHB® name.

The silicone part can be a hollow or solid profiled element. This profiled element advantageously comprises a flat surface which will receive the double-sided adhesive tape. The length of the double-sided adhesive tape is preferably substantially equal to the length of the profiled element. Furthermore, after application/adhesive bonding, the double-sided adhesive tape can cover all of the flat surface of the profiled element.

In an embodiment, in order for the non-silicone-based structural adhesive to adhere optimally to the silicone part, it is essential to prepare the surface of the latter by a surface treatment resulting in the increase in the surface energy of the latter. The silicone (polyorganosiloxane) generally exhibits, before treatment, a surface energy of the order of 20 $mJ/m^2$. However, such a surface is not satisfactorily wetted by a non-silicone-based adhesive composition.

In an embodiment, the region of the surface of the silicone part which is to be brought in contact with the non-silicone-based structural adhesive is thus subjected to a surface treatment which makes it possible to increase the surface energy to a value at least equal to 30 $mJ/m^2$. All the surface energy values in the present invention are understood as having been determined according to the sessile drop method using the Owens-Wendt theory (D. Owens and R. Wendt, Estimation of the Surface Free Energy of Polymers, in *J. Appl. Polym. Sci.*, 13 (1969), pp. 1741-1747).

The surface treatment can be advantageously a treatment by flame, by oxygen ($O_2$)—comprising plasma, by plasma torch, by corona discharge, by infrared irradiation or by UV-ozone or a chemical treatment, for example a treatment with a strong acid, a strong base or an oxidizing agent.

The hydrophilizing treatment can be carried out not very long before the treated surface comes into contact with the non-silicone-based structural adhesive. This is because the hydrophilic nature of the treated region is only transitory and disappears fairly rapidly. This phenomenon, known under the name of "hydrophobic recovery", can take place in only a few minutes and is generally attributed to the condensation of silanol groups, the reorientation of polar groups and the migration of components of low molecular weight from the inside of the part towards the surface.

In an embodiment, the surface treatment is advantageously carried out less than 5 minutes, preferably less than 3 minutes and more preferably still less than one minute before the treated region is brought into contact with the non-silicone-based structural adhesive.

The non-silicone-based structural adhesive can be applied to the region of the surface of the silicone part or else to the PSA layer of the double-sided adhesive tape or also to both simultaneously. It is preferably applied to the silicone part.

The non-silicone-based structural adhesive can be applied in an amount of between 8 and 1500 $g/m^2$, preferably between 40 and 450 $g/m^2$.

The curing of the non-silicone-based structural adhesive can be carried out without contributing energy, for example when the curing reaction takes place between the two reactants of a two-component adhesive, stored in the form of two separate compositions which are mixed immediately before application, or else in the case of a one-component adhesive which uses atmospheric moisture for the curing reaction.

The curing reaction can be triggered or accelerated by contributing thermal or actinic energy. Photocurable adhesive compositions can thus be used when the adhesive tape and/or the silicone part are not opaque to light.

The thickness of the cured non-silicone-based adhesive layer can be between 10 μm and 1 mm, or between 50 μm and 300 μm.

In an advantageous embodiment, a pressure is applied to the adhesive bonding seal for at least a portion of the curing phase.

The adhesive bonding process described above can be a continuous process, in which each of the stages described above (surface treatment of the silicone-application of a structural adhesive-contacting-curling) corresponds to a work station in a dedicated plant. In such a dedicated plant, the silicone part, preferably a silicone profiled element, successively passes:

into a surface treatment station, optionally into a station for application of a non-silicone-based structural adhesive, into a station for bringing into contact with the double-sided adhesive tape, and then into a heating or irradiation station.

The adhesive bonding seal between the silicone part and the double-sided adhesive tape exhibits a peel strength (measured according to Standard ISO 4578) of greater than 8 N/cm, preferably of between 10 and 100 N/cm, in particular between 12 and 80 N/cm.

Embodiment 1. An adhesive bonding process comprising:
treating at least one region of the surface of a silicone part so as to increase the surface energy of the region treated to a value greater than 30 $mJ/m^2$,
providing a double-sided adhesive tape comprising:
a support tape,
a first layer of a pressure-sensitive adhesive (PSA) on a first face of the support tape,
a second layer of a PSA on the second face of the support tape,
applying a non-silicone-based structural adhesive to the treated region of the surface of the silicone part and/or to the first PSA layer,
bringing the treated region of the surface of the silicone part into contact with the first PSA layer, and
curing the non-silicone-based structural adhesive.

Embodiment 2. The process of embodiment 1, wherein the adhesive forming the first PSA layer comprises an acrylic adhesive.

Embodiment 3. The process of embodiment 1, wherein the non-silicone-based structural adhesive comprises functional groups capable of reacting with groups having labile hydrogen.

Embodiment 4. The process of embodiment 1, wherein the non-silicone-based structural adhesive comprises an epoxy, a polyurethane, or a combination thereof.

Embodiment 5. The process of embodiment 1, wherein the polymer forming the support tape of the double-sided adhesive tape comprises a polyester, a poly(vinyl chloride), a fluoropolymer, a polyimide, an ethylene/propylene/diene monomer, polyurethanes, acrylates or polyolefins, such as polyethylene.

Embodiment 6. The process of embodiment 1, wherein the support tape comprises a foam.

Embodiment 7. The process of embodiment 1, wherein the first PSA layer exhibits a weight per unit area of between 10 and 50 g/m$^2$.

Embodiment 8 The process of embodiment 1, wherein the double-sided adhesive tape is composed of a homogeneous mass of acrylic foam adhesive.

Embodiment 9. The process of embodiment 1, wherein the surface treatment is a treatment by flame, by oxygen ($O_2$)-comprising plasma, by plasma torch, by corona discharge, by infrared irradiation or by UV-ozone or a chemical treatment.

Embodiment 10

The process of embodiment 1, wherein the silicone part is a profiled element comprising a flat surface.

Embodiment 11. The process of embodiment 10, wherein the length of the double-sided adhesive tape is substantially equal to the length of the profiled element, the double-sided adhesive tape preferably covering all of the flat surface of the profiled element.

Embodiment 12. The process of embodiment 1, wherein the process is a continuous process.

Embodiment 13. The process of embodiment 12, wherein the silicone part successively passes into:

a surface treatment station, optionally a station for application of a structural adhesive, a station for bringing into contact with the double-sided adhesive tape, and a heating or irradiation station.

Embodiment 14. An assemblage comprising:

a silicone part; and a double-sided adhesive tape comprising:

a support tape, a first layer of a pressure-sensitive adhesive (PSA) on a first face of the support tape, a second layer of a PSA on a second face of the support tape, wherein the silicone part and the double-sided adhesive tape being irreversibly adhesively bonded to one another using a non-silicone-based structural adhesive.

Embodiment 15. The assemblage of embodiment 14, wherein the adhesive bonding seal between the silicone part and the double-sided adhesive tape exhibits a peel strength of greater than 8 N/cm, according to the sessile drop method.

Embodiment 16. The assemblage of embodiment 14, wherein the first layer of a PSA comprises an acrylic adhesive.

Embodiment 17. The assemblage of embodiment 14, wherein the non-silicone-based structural adhesive comprises functional groups capable of reacting with groups having labile hydrogen.

Embodiment 18. The assemblage of embodiment 14, wherein the non-silicone-based structural adhesive comprises an epoxy, a polyurethane, or a combination thereof.

Embodiment 19. The assemblage of embodiment 14, wherein the polymer forming the support tape of the double-sided adhesive tape comprises a polyester, a poly(vinyl chloride), a fluoropolymer, a polyimide, an ethylene/propylene/diene monomer, polyurethanes, acrylates or polyolefins, such as polyethylene.

Embodiment 20. The assemblage of embodiment 14, wherein the support tape comprises a foam.

EXAMPLE 1 (According to the Invention)

A silicone part comprising a flat surface was produced by moulding or extrusion of a silicone formulation. The flat surface of the silicone part was treated with plasma (molecular oxygen and nitrogen at a flow rate of 200 l.min$^{-1}$) at a power of 200 W for 15 minutes. A polyurethane structural adhesive (3M™ Scotch-Weld™ Urethane Adhesive DP605NS) was deposited in the form of a thin film on the treated surface. An acrylic double-sided adhesive tape (Normount A6300 from Saint-Gobain Performance Plastics) was applied to the adhesive layer. The assemblage is left to cure for 24 h under gentle pressure. The force necessary to peel the double-sided tape from the silicone part was 16 N/cm (Standard ISO 4578).

EXAMPLE 2 (Comparative)

A silicone part comprising a flat surface was produced by moulding or extrusion of a silicone formulation. The flat surface of the silicone part was treated with plasma (molecular oxygen and nitrogen at a flow rate of 200 l.min$^{-1}$) at a power of 200 W for 15 minutes. A polyurethane structural adhesive (3M™ Scotch-Weld™ Urethane Adhesive DP605NS) was deposited in the form of a thin film on the treated surface. The non-adhesive surface of a single-sided adhesive tape having a vinyl support was applied to the adhesive layer. The assemblage was left to cure for 24 h under gentle pressure. The force necessary to peel the double-sided tape from the silicone part was 5 N/cm (Standard ISO 4578).

EXAMPLE 3 (Comparative)

A silicone part comprising a flat surface was produced by moulding or extrusion of a silicone formulation. The flat surface of the silicone part is treated with plasma (molecular oxygen and nitrogen at a flow rate of 200 l.min$^{-1}$) at a power of 200 W for 15 minutes. A polyurethane structural adhesive (3M™ Scotch-Weld™ Urethane Adhesive DP605NS) was deposited in the form of a thin film on the treated surface. The non-adhesive surface of a single-sided adhesive tape having a PET (polyethylene terephthalate) support was applied to the adhesive layer. The assemblage was left to cure for 24 h under gentle pressure. The force necessary to peel the double-sided tape from the silicone part was 6 N/cm (Standard ISO 4578).

EXAMPLE 4 (Comparative)

A silicone part comprising a flat surface was produced by moulding or extrusion of a silicone formulation. The flat surface of the silicone part was treated with plasma (molecular oxygen and nitrogen at a flow rate of 200 l.min$^{-1}$) at a power of 200 W for 15 minutes. An acrylic double-sided adhesive tape (Normount A6300 from Saint-Gobain Performance Plastics) was applied to the treated surface. The assemblage was left to cure for 24 h under gentle pressure. The force necessary to peel the double-sided tape from the silicone part was 1.5 N/cm (Standard ISO 4578).

The invention claimed is:

1. An assemblage comprising:

a silicone part; and a double-sided adhesive tape comprising:

a support tape,
a first layer of a pressure-sensitive adhesive (PSA) on a first face of the support tape,
a second layer of a PSA on a second face of the support tape,
wherein the silicone part and the double-sided adhesive tape being adhesively bonded to one another using a non-silicone-based structural adhesive, wherein the silicone part comprises a surface energy of at least equal to 30 mJ/m$^2$.

2. The assemblage of claim 1, wherein the adhesive bonding seal between the silicone part and the double-sided adhesive tape exhibits a peel strength of greater than 8 N/cm, according to the sessile drop method.

3. The assemblage of claim 1, wherein the first layer of a PSA comprises an acrylic adhesive.

4. The assemblage of claim 1, wherein the non-silicone-based structural adhesive comprises functional groups capable of reacting with groups having labile hydrogen.

5. The assemblage of claim 1, wherein the non-silicone-based structural adhesive comprises an epoxy, a polyurethane, or a combination thereof.

6. The assemblage of claim 1, wherein the polymer forming the support tape of the double-sided adhesive tape comprises a polyester, a poly(vinyl chloride), a fluoropolymer, a polyimide, an ethylene/propylene/diene monomer, polyurethanes, acrylates or polyolefins.

7. The assemblage of claim 1, wherein the support tape comprises a foam.

8. The assemblage of claim 1, wherein the first PSA layer exhibits a weight per unit area of between 10 and 50 g/m$^2$.

9. The assemblage of claim 1, wherein the double-sided adhesive tape is composed of an acrylic foam adhesive.

10. The assemblage of claim 1, wherein the silicone part is a profiled element comprising a flat surface.

11. The assemblage of claim 10, wherein the length of the double-sided adhesive tape is substantially equal to the length of the profiled element.

12. The assemblage of claim 1, wherein the thickness of the cured non-silicone-based adhesive is between 10 μm and 1 mm.

13. The assemblage of claim 1, wherein the silicone part is a solid profiled element.

14. The assemblage of claim 1, wherein the silicone part is a hollow profiled element.

15. The assemblage of claim 1, wherein the support tape comprises cellulose fibers.

16. The assemblage of claim 1, wherein the support tape comprises thermoplastic organic polymer.

17. The assemblage of claim 1, wherein the non-silicone based structural adhesive comprises an epoxy.

18. The assemblage of claim 1, wherein the non-silicone based structural adhesive comprises an acrylic.

19. The assemblage of claim 1, wherein the non-silicone based structural adhesive comprises a cyanoacrylic.

20. The assemblage of claim 1, wherein the non-silicone based structural adhesive comprises a phenolic.

* * * * *